(12) United States Patent
Patterson

(10) Patent No.: US 7,272,835 B2
(45) Date of Patent: Sep. 18, 2007

(54) APPARATUS AND METHOD FOR OBTAINING A STRING REPRESENTATION OF OBJECTS IN DISPLAYED HIERARCHICAL STRUCTURES

(75) Inventor: Bret Patterson, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 10/184,487

(22) Filed: Jun. 28, 2002

(65) Prior Publication Data

US 2004/0001077 A1 Jan. 1, 2004

(51) Int. Cl.
*G06F 9/44* (2006.01)

(52) U.S. Cl. .................. 719/316; 719/318; 715/700

(58) Field of Classification Search ............ 715/700, 715/762, 808; 709/219; 717/100, 109; 707/1; 714/38; 719/316, 318
See application file for complete search history.

(56) References Cited

U.S. PATENT DOCUMENTS

| | | | | |
|---|---|---|---|---|
| 5,115,504 A | * | 5/1992 | Belove et al. | 707/100 |
| 5,509,116 A | * | 4/1996 | Hiraga et al. | 707/1 |
| 5,781,720 A | * | 7/1998 | Parker et al. | 714/38 |
| 5,977,967 A | * | 11/1999 | Berner et al. | 715/826 |
| 6,112,207 A | * | 8/2000 | Nori et al. | 707/101 |
| 6,128,016 A | * | 10/2000 | Coelho et al. | 715/808 |
| 6,145,077 A | * | 11/2000 | Sidwell et al. | 712/300 |
| 6,496,202 B1 | * | 12/2002 | Prinzing | 715/762 |
| 6,594,708 B1 | * | 7/2003 | Slaughter et al. | 719/315 |
| 6,678,867 B2 | * | 1/2004 | Fong et al. | 715/523 |
| 6,701,513 B1 | * | 3/2004 | Bailey | 717/109 |
| 6,772,408 B1 | * | 8/2004 | Velonis et al. | 717/100 |
| 6,810,414 B1 | * | 10/2004 | Brittain | 709/219 |
| 6,922,813 B1 | * | 7/2005 | Korenshtein | 715/762 |

OTHER PUBLICATIONS

Ghosh et al. "A test management and software visualization framework for heterogeneous distributed applications", 2001 IEEE, pp. 1-11.☐☐*
Chen et al. "A GUI environment to manipulate FSMs for testing GUI-based applications in Java", 2001 IEEE, pp. 1-10.*

* cited by examiner

*Primary Examiner*—William Thomson
*Assistant Examiner*—George Opie
(74) *Attorney, Agent, or Firm*—Duke W. Yee; Jeffrey S. LaBaw; Wayne P. Bailey

(57) ABSTRACT

An apparatus and method for obtaining a string representation of objects in a displayed hierarchical structure are provided. With the apparatus and method, a list having separators may be converted into a path equivalent for a specified hierarchical structure. In order to convert the separated list into a textual representation for an object in a hierarchical structure, an input string having separators is received and the cell renderer for a hierarchical structure is identified. Comparisons between portions of the separated list are compared to string representations for objects in the hierarchical structure in order to identify matches and ultimately, a path in the hierarchical structure corresponding to the separated list. The string representations for the objects are obtained by identifying the cell renderer component that is used to paint the object on a display.

24 Claims, 6 Drawing Sheets

FIG. 5A

```
/** This turns a L separated list into the TreePath equivalent for the specified JTree.
 *Due to some objects security this method is not perfect. We
 *We start at row 0 and go through all the rows find the first
 *row that matches the specified string until we have no more strings to match.
 *Currently this matches the first occurrence of... L<string> while only verifying
 *that all other.L <string>L are actually present and above it. Does not guarantee an actual
 *"tree" of type L<node> L<subnode> L<subnode> is present. This will be fixed to
 *guarantee this tree structure next release.
 *then we are ok.
 *@since JAG v2.0.2
 */
public static TreePath getTreePath (JTree theTree,String value,boolean useUserObject) {
        String name=null;
        //get Root path
        int pos=0;
        int endpos=0;
        TreePath thePath=null;
        Object tp=null;
        int numRows=0;
        int i=0;
        TreeCellRenderer tc=null;
        Component tcc=null;
        String name2=null;

//Get the Cell Renderer. This Object is responsible for returning objects that are used
//to draw a "Node" in the tree.
tc=theTree.getCellRenderer();
        //for backward compatibility
//the old separator use to be/, it's now L, however if no L exists in
//the path specified we can assume their using the old/syntax.
                if( value.indexOf(" L ")<0 )
                        TSEP = "/";

if( value.indexOf(TSEP)==0 )
                        value=value.substring(TSEP.length());

//Here we are grabbing the first string after the top level L which denotes the top
//level node.
                if( value.indexOf(TSEP)<0 ) {
                        name=value;
                        pos=value.length()+1;
                } else {
                        endpos=value.indexOf(TSEP);
                        name=value.substring(0,endpos);
                        pos=endpos+TSEP.length();
                }
//now we go through all the rows in the tree and for each value between L
//find a match for the element
                numRows=theTree.getRowCount();
                for ( i=0;i<numRows ;i++ ) {
//Get the Path object for the current row.
                        thePath=theTree.getPathForRow(i);
//get the Lowest Path object, IE the leaf node for this row
```

```
tp=thePath.getLastPathComponent();
    if( tp==null )
        tp=thePath;
//Request the Component that is in charge of drawing this node
    tcc=
tc.getTreeCellRendererComponent(theTree,tp,theTree.isRowSelected(i),theTree.isExpanded(thePath),false,i,true);
    name2=null;

// Here we are asking the component to run getText, and getLabel to return the String
//representation of the object that is used to draw the node. If the methods are
//present we have a 99% chance of getting the correct string representation. If
//they are not present then we need to do a bit more work to find the object that
//contains these methods
    if( tcc !=null ) {
        name2=(String) runMethod(tcc,"getText",null);
    }
    if( name2==null )
        name2=(String) runMethod(tcc,"getLabel",null);

//Websm uses pictures to show their objects. So the only way to get their string
//representation is the below method.
//hasAncestorNamed tells me if tcc derives from the specified java class
    if( name2==null&&tcc!=null&&
            hasAncestorNamed("com.ibm.websm.container.mocontainer.WObjectRenderer",tcc) ) {
        tp=runMethod(tp,"getUserObject",null);
        name2=((JTree)theTree).convertValueToText(tp,false,false,true,0,false);
    }

//if we still haven't found a String representation for this object we check
//to see if the CellRendererComponent returned was a "container". If so the
//correct object we want will be derived from either a JLabel of a JTextComponent
//more than likely. So first find a component in the container that derives from
//either a JLabel or a JTextComponent, and then call getText on that object. If we
//find an object derived from these two components we are guaranteed it will
//have the getText method.
    if( name2==null ) {
        //if the component is a container try to find a text type component under it to get label from
        if( tcc !=null&&jag_Util.hasAncestorNamed("java.awt.Container",tcc) ) {
            tp=getComponentFromContainer((Container)tcc,"javax.swing.JLabel");
            if( tp !=null ) {
                name2=(String)runMethod(tp,"getText",null);
            } else {
                tp=getComponentFromContainer((Container)tcc,"javax.swing.JTextComponent");
                if( tp !=null ) {
                    name2=(String)runMethod(tp,"getText",null);
                }
            }
        }
    }
```

```
// If we still haven't found a suitable object to get the string name for then
//print out a lot of debug information if debugging is on and fall back to
//the plain old method of the standard and hope it works.
            if( name2==null ) {
                if(jag_Properties.getDebug() ) {
                    log(INFO,"No method getText/getLabel found in renderer.");
                    if( tcc !=null ) {
                        log(INFO,"Renderer class:"+tcc.getClass().getName());
                        printInheritanceTree(tcc);
                        printMethods(tcc);
                    } if( useUserObject ) {
                        tp=runMethod(tp,"getUserObject",null);
                        if( tp==null )
                            tp==thePath;
                    }
                    name2=((JTree)theTree).convertValueToText(tp,false,false,true,0,false);
                }
//              log(INFO,"comparing"+name+"to"+name2);
//Now we check if this objects string name is the node we wish, if so we
//goto the next node in the string specified and start looking for it.
            if( name.equals(name2) ) {
                endpos=value.indexOf(TSEP,pos);
                if( endpos<0 )
                    endpos-value.length();
//if we've matched all the nodes in the string then break out of the search as
//we've found the position and it's contained in thePath
                if( pos>=value.length() )
                    break;
                name=value.substring(pos,endpos);
                pos=endpos+TSEP.length();
                if( endpos==value.length() )
                    endpos++;
            }
        }
        if( i>=numRows ) {
            log(ERROR,"Unable to find tree node:"+value+"is it visible?");
            return null;
        }
        return thePath;
    }
```

APPARATUS AND METHOD FOR OBTAINING A STRING REPRESENTATION OF OBJECTS IN DISPLAYED HIERARCHICAL STRUCTURES

BACKGROUND OF THE INVENTION

1. Technical Field

The present invention is generally directed to an improved computing system. More specifically, the present invention is directed to an apparatus and method for obtaining string representations of nodes in displayed hierarchical structures.

2. Description of Related Art

To ensure that applications perform and operate as expected, they need to be tested prior to release. Such testing involves the adoption of a test management strategy followed by the performance of load testing and functional testing on the applications. Load testing involves the emulation of multiple users interacting with an application infrastructure to ascertain where any bottlenecks may exist. Functional testing involves automatically capturing, verifying and replaying user interactions to determine if the applications function as expected.

A known mechanism for performing functional tests on applications is the WinRunner program available from Mercury Interactive. With the WinRunner program, test scripts are generated by recording a user's interaction with a particular version of an application's graphical user interface (GUI). The recording is then later replayed to test the application, or other versions of the application, with different data sets. Reports are generated indicating the events occurring during the test and any errors that may occur.

A problem with GUI test harnesses, such as WinRunner, is the representation of nodes of hierarchical structures, such as tree and list structures, in such a way that a user may specify an appropriate string in a test script for selecting the node that they see on the screen. This is a significant problem because the tree nodes and list items may be arbitrary objects, making it extremely difficult to convert what the user sees on the screen to a string representation that they can use to specify which tree node or list item they wish to select.

Typically, in order to obtain a string representation of the node in a tree or list structure in an object oriented environment, such as a Java JTree or JList a call to the method toString( ) on the node itself is used. However, with complex objects, i.e. objects whose toString( ) does not return what is seen on the screen such as a container object which contains an image object and a text label object, the string returned by this method does not bear any resemblance to the object depicted in the tree or list structure. As a result, if the user were to try and correlate the string returned by toString( ) with the tree or list at a later time, it would be very difficult to identify which node in the tree or list corresponds to this string.

For example, assume that there is a tree structure having the following organization:

---

Hostname
   Directory 1
   Directory 2
      SubDirectory 1

---

When generating a test script for a testing harness by recording the user's interaction with the GUI, when the user selects the SubDirectory 1 from the tree structure, it is necessary to convert the displayed object, i.e. node, into a string representation of the object. Using known mechanisms to obtain this string representation, e.g., using the toString( ) method call on the SubDirectory 1 node, a string representation is returned that bears no likeness to the tree structure shown above. For example, a string such as the following may be returned:

Hostname: implicit method call getHost|_Directory:
      level 2 implicit Call 5|_Directory:Level 2
      implicit Call 5 where the symbol "|_" is a separator that indicates traversing down into the tree structure. It is clear from the above, that if a user, at a later time, attempts to resolve this string to a displayed node in the tree structure, it would be very difficult for that user to identify which node in the tree structure corresponds to the string.

Thus, it would be beneficial to have an apparatus and method that is capable of automatically identifying a selected tree or list object with a string representation that resembles the displayed node in its tree or list structure.

SUMMARY OF THE INVENTION

The present invention provides an apparatus and method for obtaining a string representation of objects in a displayed hierarchical structure. This string representation may then be used to reference the object at a later time, e.g., in test scripts and the like.

With the apparatus and method of the present invention, a list having separators, such as "|_" or "/", may be converted into a path equivalent, such as a TreePath, for a specified hierarchical structure, such as a JTree. The path may then be used to reference objects in a display of the hierarchical structure. The path may also be used to render the objects in the hierarchical structure.

In order to convert the separated list into a textual representation for an object in a hierarchical structure, an input string having separators is received and the cell renderer for a hierarchical structure is identified. The first string portion of the input string (portions being delimited by the separators), is identified and a search of the hierarchical structure is performed to find an object in the hierarchical structure matching the first string portion.

The search of the hierarchical structure involves taking an object, or node, at a row, i.e. level of the hierarchical structure, obtaining a text representation for the object, and comparing the text representation for the object to the input string portion. If there is not a match, the next object, or node, in the hierarchical structure is checked and so on until the end of the hierarchical structure is encountered. If the end of the hierarchical structure is encountered and there are still portions of the input string for which a matching node in the hierarchical structure is not found, then the present invention terminates with a failure indication.

If the text representation for the object matches the input string portion, the next input string portion is checked against a text representation for the next node in the hierarchical structure. This process continues until either the end of the hierarchical structure is encountered or there are no more input string portions to process. If there are no more input string portions to process, then the hierarchical structure path identified by the matching is output.

The present invention obtains the textual representation for a hierarchical structure object or node by identifying the renderer component for the object or node and determining if the renderer component contains a valid string method that may be used to extract the string representation from the object or node. If so, the valid string method is called to obtain the string representation which is then compared against the input string portion. If the renderer component is a null object, then a default method of converting the hierarchical structure object or node into a textual representation is used to generate the string for the comparison, e.g., the toString( ) method may be utilized.

If the renderer component does not include a valid string method and the renderer component is not null, then a determination is made as to whether or not the renderer component is a container. If not, again the default method of converting the object or node to a string is utilized. If the renderer component is a container, the renderer component is search for an object that derives from a label or text component object. This indicates that the object is used to represent text on a display and is likely to have methods for obtaining the textual representation. The identified object is then used to determine if a valid string method exists, and if so, the valid string method is used to obtain the textual representation for the hierarchical structure object or node.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A-5C illustrate exemplary code for implementing the functions shown in the flowchart of FIG. 4.

DETAILED DESCRIPTION OF THE PREFERRED EMBODIMENT

Figure 1:
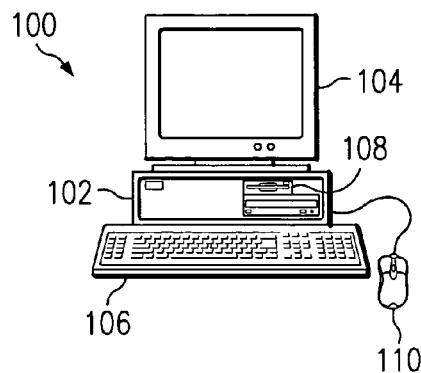
FIG. 1 is a pictorial diagram of a data processing system in which the present invention may be implemented.
Figure 2:
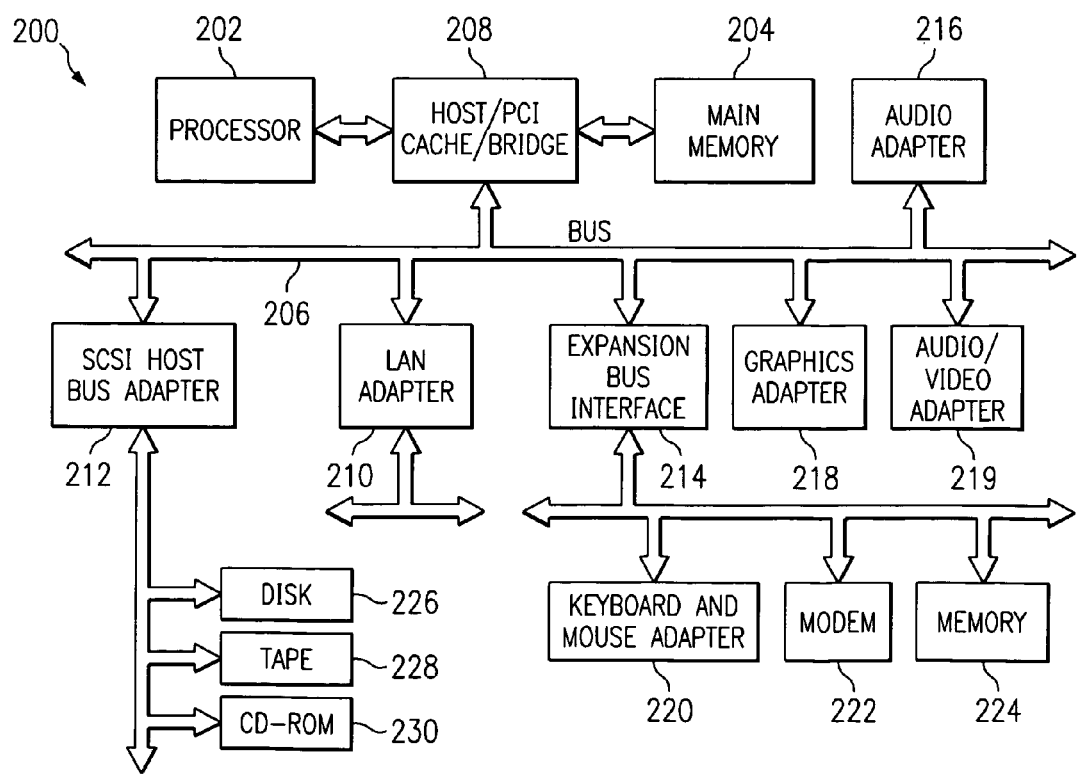
FIG. 2 is an exemplary block diagram of a data processing system in which the present invention may be implemented.

The present invention provides an apparatus and method for generating string representations of objects in a hierarchical structure, such as a tree or list structure. The present invention may be implemented in any known or later developed computing system. FIGS. 1 and 2 are provided as an exemplary computing system in which the present invention may be implemented. However, FIGS. 1 and 2 are not intended to imply any limitation as to the computing systems on which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y.

Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used.

Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP operating system, which is a trademark of and available from Microsoft Corporation. An object oriented programming system such as Java programming system may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2.

Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

The present invention provides a method and apparatus for obtaining a textual representation of an object in a hierarchical structure, such as a tree or list. As set forth hereafter, the preferred embodiments of the present invention are described in terms of a Java implementation, however the present invention is not limited to such. Rather, the present invention may be implemented in any object-oriented environment in which hierarchical structures of objects are displayed using graphical user interfaces (GUIs). The preferred embodiments will be described in terms of a tree hierarchical structure, however the present invention may be applied to any hierarchical structure including lists of objects, and the like.

The class JTree in Java, is a control that displays a set of hierarchical data as an outline. A specific node, i.e. an object that may be a file, a folder, a portion of data, etc., in the tree can be identified by a TreePath (an object that encapsulates a node and all of its ancestors), or by its display row, where each row in the display area displays one node. An expanded node is a node that displays its children. A collapsed node is a node that hides its children. A hidden node is a node that is under a collapsed ancestor node. All of a viewable node's parent nodes are expanded, but may or may not be displayed. A displayed node is both viewable and is in the display area where it can be seen by a user.

When a tree structure is rendered in the Java environment, for every node in the JTree, a tree cell renderer is called to render the display of that node in the displayed JTree. The tree cell renderer may be a custom tree cell renderer or may be a default one. When the tree is rendered, the tree cell renderer for each node is asked to return a JComponent that the tree will use to paint the tree cell.

With the present invention, a request is sent to the JTree requesting the JComponent that the JTree uses to paint a selected object on the screen. Since this JTree component is used to paint the object, the JTree component typically includes methods for obtaining text that is painted on the screen to represent the object.

Once the JComponent is identified by requesting it from the JTree, reflection is performed on the JComponent to request its string representation. Reflection is an Application Program Interface in Java that allows an executing Java program to examine or "introspect" upon itself, and manipulate internal properties of the program. For example, it is possible for a Java class to obtain the names of all its members and display them.

Since most JComponents include the method calls getText( ) and getLabel( ), the use of reflection on the Jcomponent has a high likelihood of returning a string representation that resembles the actual object displayed in the JTree. Through the use of reflection, essentially the getText( ) and/or getLabel( ) methods are called to obtain the textual representation of the object that is painted by the Jcomponent.

In particular, with the apparatus and method of the present invention, a textual list having separators, such as "|" or "/", may be converted into a path equivalent, such as a TreePath, for a specified hierarchical structure, such as a JTree. The TreePath may then be used to reference objects in a display of the JTree. The TreePath may also be used to render the objects in the JTree.

In order to convert a separated list, e.g., Root|_Subnode1 |_Subnode2 |_Subnode3, into a textual representation for a corresponding object in a JTree, it is first necessary to match the separated list to an object in the JTree. To do this, an input string having separators is received and the cell renderer for JTree is identified. The first string portion of the input string (portions being delimited by the separators), is identified and a search of the JTree is performed to find an object in the JTree matching the first string portion.

The search of the JTree involves taking an object, or node, at a row, i.e. level of the JTree, obtaining a text representation for the object, and comparing the text representation for the object to the input string portion. If there is not a match, the next object, or node, in the JTree is checked and so on until the end of the JTree is encountered. If the end of the JTree is encountered and there are still portions of the input string for which a matching node in the JTree is not found, then the present invention terminates with a failure indication.

If the text representation for the object matches the input string portion, the next input string portion is checked against a text representation for the next node in the JTree. This process continues until either the end of the JTree is encountered or there are no more input string portions to process. If there are no more input string portions to process, then the JTree path identified by the matching is output.

The present invention obtains the textual representation for a JTree object or node by identifying the tree cell renderer component for the object or node and determining if the tree cell renderer component contains a valid string method, such as getText( ) or getLabel( ), that may be used to extract the string representation from the object or node. If so, the valid string method is called, e.g., through reflection, to obtain the string representation which is then compared against the input string portion. If the tree cell renderer component is a null object, then a default method of converting the JTree object or node into a textual representation is used to generate the string for the comparison, e.g., the toString( ) method may be utilized.

If the tree cell renderer component does not include a valid string method and the tree cell renderer component is not null, then a determination is made as to whether or not the tree cell render component is a container. If not, again the default method of converting the object or node to a string is utilized. If the tree cell renderer component is a container, the tree cell renderer component is search for an object that derives from a label or text component object, such as JLabel or JTextComponent. This indicates that the object is used to represent text on a display and is likely to have methods for obtaining the textual representation. The identified text component object is then used to determine if a valid string method exists, e.g., if the text component object includes a valid string method. If so, the valid string method is used to obtain the textual representation for the hierarchical structure object or node.

Thus, using the mechanism described above, the present invention is able to obtain a string representation of an object in a hierarchical structure that resembles the display of the object. For example, the string representation may take the form:

Node|_subNode1|_subNode2 which is similar and resembles the way that the tree levels would be displayed to the user. In this way, a user may specify a tree node to select/expand using this type of format in a test script so that it can later be compared to the JTree's internal representation to determine exactly which node is being referenced by the user.

Figure 3:
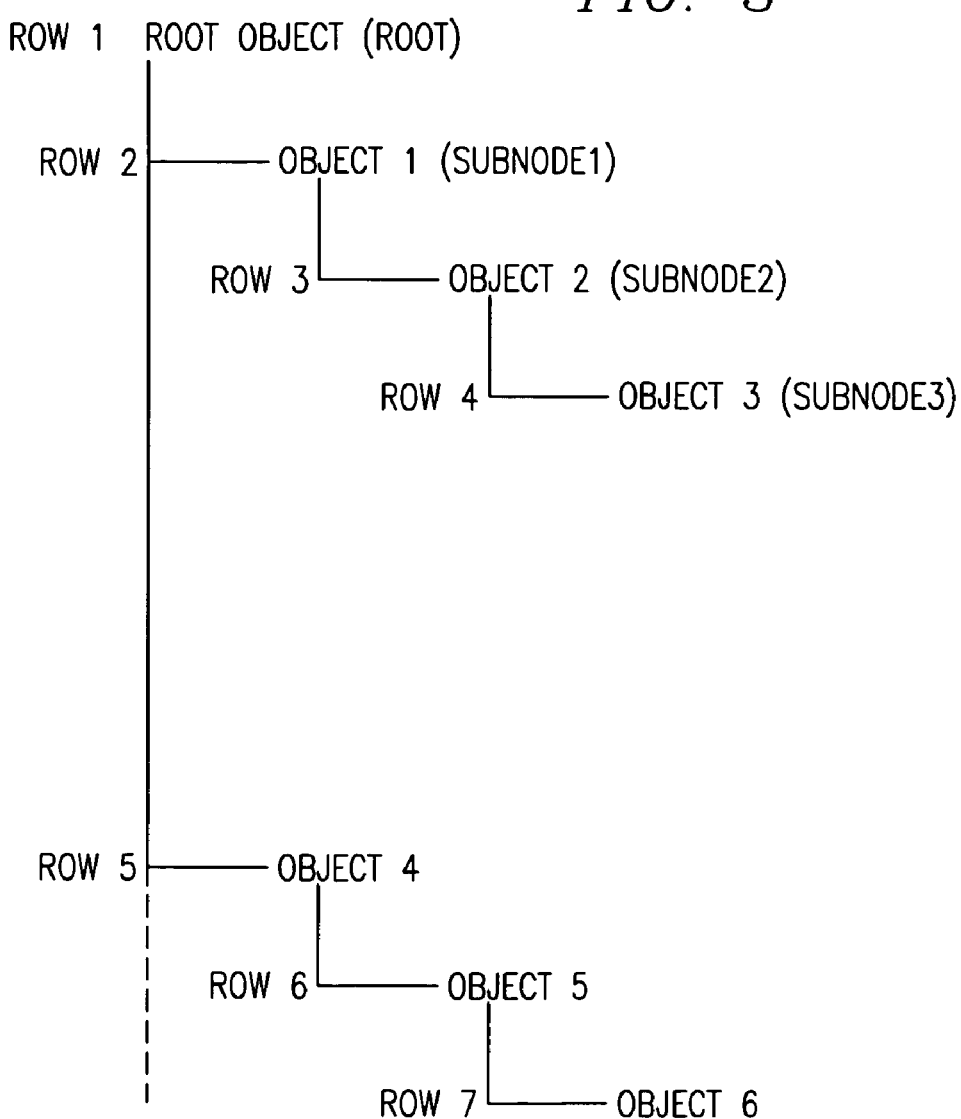
FIG. 3 is an exemplary diagram illustrating a tree structure in accordance with the present invention.

FIG. 3 is an exemplary diagram illustrating a tree structure in accordance with the present invention. As an example of how the present invention may be used with the tree structure of FIG. 3, assume that an input string has the following separated list format:

Root|_Subnode1|_Subnode2|_Subnode3

With the present invention, the tree cell renderer for the JTree shown in FIG. 3 is obtained. And the Root Object is identified from the JTree. The method getTreeCellRendererComponent( ) is called on the TreeCellRender to identify the JComponent used to render the Root Object. A determination is then made as to whether this JComponent has a valid string method for obtaining a string representation for the Root Object.

Assume that the JComponent includes the method getText( ). As a result, the method getText( ) in the JComponent is called, through reflection, on the Root Object to obtain the textual representation "Root." This textual representation "Root" is then compared to the first string portion of the input string. The result is a match. Since there is a match, the next portion of the input string is identified and the next node in the JTree below the Root Object is identified, i.e. the node corresponding to Object 1 in row 2 of the JTree.

The same process is performed on Object 1 and the textual representation "Subnode1" is obtained from the getText( ) or getLabel( ) method of the JComponent for Object 1. Again the comparison is performed and a match is identified.

This same process is repeated for rows 3 and 4 of the JTree. Each time, a match is identified. Once there are no longer any more portions of the input string to be processed, the resulting TreePath object is output for use in later identifying the object represented by the input string. Such information may then be stored in a data structure for future reference, for example, in generating test scripts or otherwise referencing the object using the input string.

Figure 4:
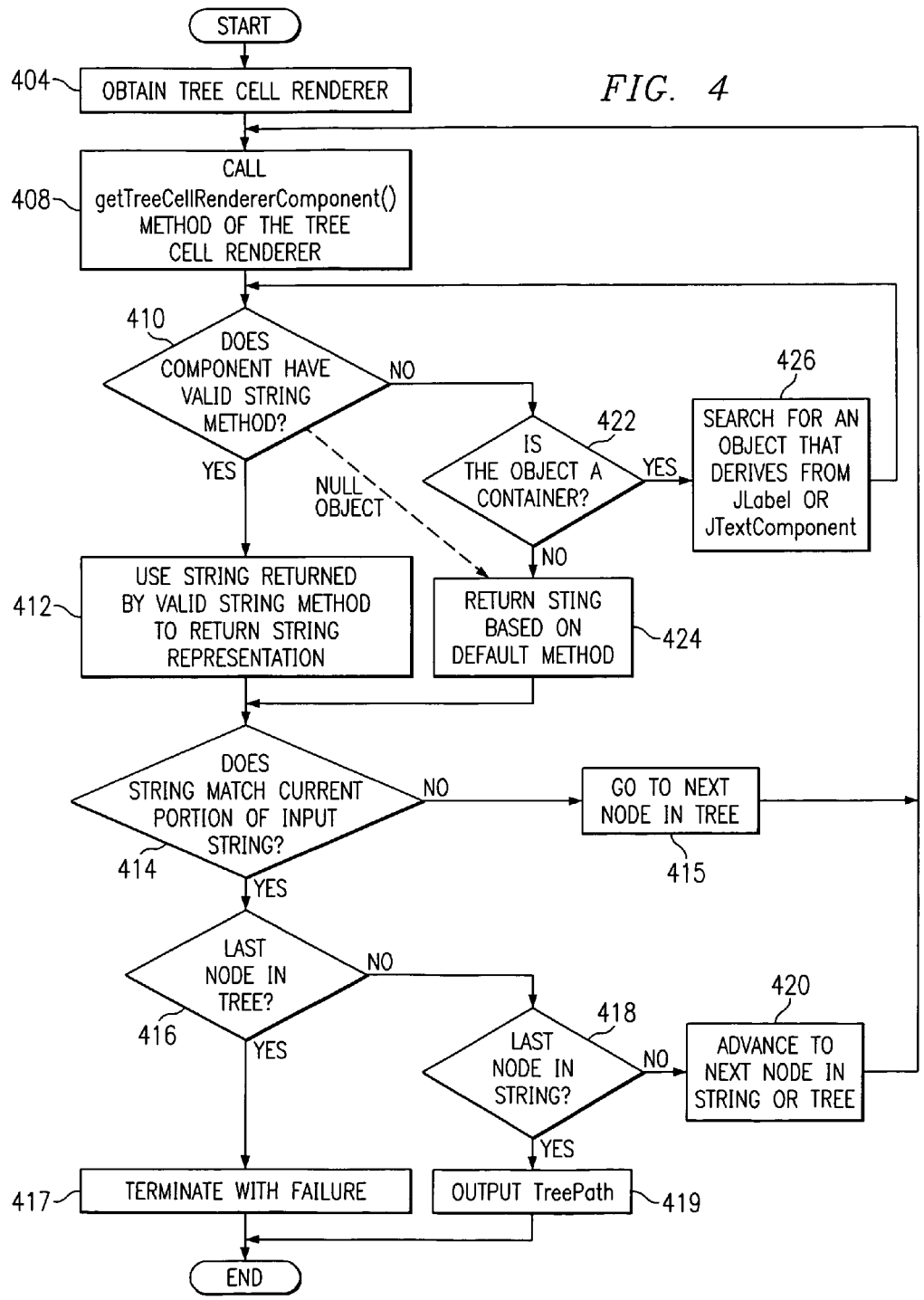
FIG. 4 is a flowchart outlining an exemplary operation of the present invention.

FIG. 4 is a flowchart outlining an exemplary operation of the present invention. As shown in FIG. 4, upon input of a string having a separated list format, the operation of the present invention starts with obtaining a tree cell renderer for the JTree (step 404). Then the getTreeCellRendererComponent( ) method of the Tree Cell Renderer is called on the next node in the tree (step 408).

A determination is made as to whether the JComponent obtained from the call of the getTreeCellRenderer Component( ) includes a valid string method (step 410). If so, the valid string method is used to obtain a string representation for the node of the tree (step 412). If a valid string method is not part of the JComponent, a determination is made as to whether the JComponent is a container (step 422). If so, a search within the JComponent for an object that derives from JLabel or JTextComponent is performed (step 426) and this identified Object is used as a basis for obtaining the string representation (return to step 410). If the Jcomponent is not a container, or if the Jcomponent is a null object, a default method is used to obtain the string representation for the node (step 424).

Once a string representation is obtained for the node in the JTree, a determination is made as to whether the string representation matches the current portion of the input string (step 414). If not, the operation goes to the next node in the JTree (step 415) and returns to step 408. If there is a match, a determination is made as to whether this is the last node in the tree (step 416). If so, the operation terminates with a failure (step 417).

If this is not the last node in the tree, a determination is made as to whether this is the last node in the input string (step 418). If so, the tree path obtained from the matching operation is output (step 419). If this is not the last node in the string or this is not the last node in the tree, the operation advances to the next node in the string and/or tree (step 420) and the operation returns to step 408.

FIGS. 5A-5C illustrate exemplary code for implementing the functions described in the flowchart of FIG. 4. The code shown in FIGS. 5A-5C is only exemplary and many modifications may be made to this exemplary code without departing from the spirit and scope of the present invention.

Thus, the present invention provides a mechanism that allows a textual representation of an object in a hierarchical structure to be generated that resembles the visual depiction of the object. As a result, the present invention provides a more user friendly and user recognizable string representation for an object in a hierarchical structure.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiments described above were chosen and described in order to best explain the principles of the invention, the practical application, and to enable others of ordinary skill in the art to understand the invention for various embodiments with various modifications as are suited to the particular use contemplated.

What is claimed is:

1. A method for obtaining a string representation of a graphical user interface object, comprising:
   associating a first graphical user interface (GUI) object, from a set of GUI objects arranged in hierarchical structure, with a respective first rendering process used to render the first GUI object on a display;
   requesting a first component object from the first rendering process;
   determining if the first component object includes a method for obtaining a string representation of the GUI object;
   calling the method in the first component object to obtain the string representation if the first component object includes the method for obtaining the string representation of the GUI object;
   receiving an input string having a plurality of portions separated by a separator;
   identifying a current portion of the input string;
   comparing the string representation to the current portion of the input string to determine if the string representation matches the current portion of the input string, wherein if the string representation matches the current portion of the input string, the method further comprises:
   identifying a next GUI object in the set of GUI objects if the string representation matches the current portion of the input string;
   identifying a next portion of the input string as the current portion of the input string;
   associating the next GUI object with a respective second rendering process used to render the next GUI object on a display;
   requesting a second component object from the second rendering process;
   calling a method in the second component object to obtain a second string representation;
   comparing the second string representation to the current portion of the input string; and
   determining if the second string representation matches the current portion of the input string.

2. The method of claim 1, further comprising:
   adding the object to a path object for the input string if the string representation matches the current portion of the input string.

3. The method of claim 2, further comprising:
   determining if the current portion of the input string is a last portion of the input string; and
   outputting the path object if the current portion of the input string is a last portion of the input string.

4. The method of claim 1, wherein the hierarchical structure is a JTree.

5. The method of claim 1, wherein the first component object is a JComponent and wherein the method is one of getTex( ) and getLabel( ).

6. The method of claim 1, wherein calling the method in the first component object to obtain the string representation includes:
   determining if the first component object is a container object if the first component object does not include a method for obtaining the string representation of the GUI object, wherein the container object comprises an image object an a text label object.

7. The method of claim 6, further comprising:
   searching the first component object for an alternative object derived from an object used to render text if the first component object is a container object; and
   using the alternative object to generate the string representation.

8. The method of claim 6, further comprising:
   using a default method of converting a GUI object to a string representation if the first component does not include a method for obtaining a string representation of the GUI object and the first component object is not a container object.

9. A tangible computer program product in a tangible computer readable medium for obtaining a string representation of a graphical user interface object, comprising:
   first instructions for associating a first graphical user interface (GUI) object, from a set of GUI objects arranged in a hierarchical structure, with a respective first rendering process used to render the first GUI object on a display;
   second instructions for requesting a first component object from the first rendering process;
   third instructions for determining if the first component object includes a method for obtaining a string representation of the GUI object;
   fourth instructions for calling the method in the first component object to obtain the string representation if the first component object includes the method for obtaining the string representation of the GUI object;
   fifth instructions for receiving an input string having a plurality of portions separated by a separator;
   sixth instructions for identifying a current portion of the input string;
   seventh instructions for comparing the string representation to the current portion of the input string to determine if the string representation matches the current portion of the input string; instructions for identifying next GUI object in the set of GUI objects if the string representation matches the current portion of the in string;
   instructions for identifying next portion of the input string as the current portion of the input string;
   instructions for associating the next GUI object with a respective second rendering process use to render the next GUI object on a display;
   instructions for requesting a second component object from the second rendering process;
   instructions for calling a method in the second component object to obtain a second string representation;
   instructions for comparing the second string representation to the current portion of the input string; and
   instructions for determining if the second string representation matches the current portion of the input string.

10. The computer program product of claim 9, further comprising: eighth instructions for adding the object to a path object for the input string if the string representation matches the current portion of the input string.

11. The computer program product of claim 10, further comprising:
    ninth instructions for determining if the current portion of the input string is a last portion of the input string; and
    tenth instructions for outputting the path object if the current portion of the input string is a last portion of the input string.

12. The computer program product of claim 9, wherein the hierarchical structure is a JTree.

13. The computer program product of claim 9, wherein the first component object is a JComponent and wherein the method is one of getText( ) and getLabel( ).

14. The computer program product of claim 9, wherein the fourth instructions for calling the method in the first component object to obtain the string representation include:
  instructions for determining if the first component object is a container object if the first component object does not include method for obtaining the string representation of the GUI object, wherein the container object comprises an image object and a text label object.

15. The computer program product of claim 14, further comprising:
  instructions for searching the first component object for an alternative object derived from an object used to render text if the first component object is a container object; and
  instructions for using the alternative object to generate the string representation.

16. The computer program product of claim 14, further comprising:
  instructions for using a default method of converting a GUI object to a string representation if the first component does not include a method for obtaining a string representation of the GUI object and the first component object is not a container object.

17. An apparatus for obtaining a string representation of a graphical user interface object, comprising:
  means for associating a first graphical user interface (GUI) object, from a set of GUI objects arranged in a hierarchical structure, with a respective first rendering process used to render the first GUI object on a display;
  means for requesting a first component object from the first rendering process;
  means for determining if the first component object includes a method for obtaining a string representation of the GUI object;
  means for calling the method in the first component object to obtain the string representation if the first component object includes the method for obtaining the string representation of the GUI object;
  means for receiving an input string having a plurality of portions separated by a separator;
  means for identifying a current portion of the input string;
  means for comparing the string representation to the current portion of the input string to determine if the string representation matches the current portion of the input string;
  means for identifying a next GUI object in the set of GUI objects if the string representation matches the current portion of the input string;
  means for identifying a next portion of the input string as the current portion of the input string;
  means for associating the next GUI object with a respective second rendering process used to render the next GUI object on a display;
  means for requesting a second component object from the second rendering process;
  means for calling a method in the second component object to obtain a second string representation;
  means for comparing the second string representation to the current portion of the input string; and
  means for determining if the second string representation matches the current portion of the input string.

18. The apparatus of claim 17, further comprising: means for adding the object a path object for the input string if the string representation matches the current portion of the input string.

19. The apparatus of claim 18, further comprising:
  means for determining if the current portion of the input string is a last portion of the input string; and
  means for outputting the path object if the current portion of the input string is a last portion of the input string.

20. The apparatus o claim 17, wherein the hierarchical structure is a JTree.

21. The apparatus of claim 17, wherein the first component object is a JComponent and wherein the method is one of getTex( ) and getLabel( ).

22. The apparatus of claim 17, wherein the means for calling the method in the first component object to obtain the string representation includes:
  means for determining if the first component object is a container object if the first component object does not include a method for obtaining the string representation of the GUI object, wherein the container object comprises an image object and a text label object.

23. The apparatus of claim 22, further comprising:
  means for searching the first component object for an alternative object derived from an object used to render text if the first component object is a container object; and
  means for using the alternative object to generate the string representation.

24. The apparatus of claim 22, further comprising:
  means for using a default method of converting a GUI object to a string representation if the first component does not include a method for obtaining a string representation of the GUI object and the first component object is not a container object.

* * * * *